(12) United States Patent
Fischer

(10) Patent No.: US 8,115,456 B2
(45) Date of Patent: Feb. 14, 2012

(54) CIRCUIT FOR A POWER SUPPLY UNIT FOR GENERATING A DC VOLTAGE

(75) Inventor: Andreas Fischer, Amberg (DE)

(73) Assignee: Siemens Aktiengesellschaft, Munich (DE)

( * ) Notice: Subject to any disclaimer, the term of this patent is extended or adjusted under 35 U.S.C. 154(b) by 423 days.

(21) Appl. No.: 12/457,320

(22) Filed: Jun. 8, 2009

(65) Prior Publication Data

US 2009/0309554 A1    Dec. 17, 2009

(30) Foreign Application Priority Data

Jun. 10, 2008  (DE) .................. 10 2008 027 583

(51) Int. Cl.
*H02J 7/00*    (2006.01)
(52) U.S. Cl. .................. 320/166; 307/108; 327/100
(58) Field of Classification Search .................. 320/166; 307/108; 327/100
See application file for complete search history.

(56) References Cited

U.S. PATENT DOCUMENTS

| | | | |
|---|---|---|---|
| 4,013,935 A * | 3/1977 | Siepmann et al. .............. | 363/19 |
| 5,146,398 A | 9/1992 | Melis et al. | |

FOREIGN PATENT DOCUMENTS

| | | |
|---|---|---|
| EP | 1306965 A2 | 5/2003 |
| JP | 4165958 A | 6/1992 |
| WO | WO 0049705 A1 | 8/2000 |

\* cited by examiner

*Primary Examiner* — Reena Aurora

(74) *Attorney, Agent, or Firm* — Harness, Dickey & Pierce, P.L.C.

(57) ABSTRACT

A circuit is disclosed for a power supply unit for generating a DC voltage, the power supply unit having a current transformer, a rectifier, a series circuit including a first blocking diode and a charging capacitor, an electronic switch which is in parallel with the current transformer, a comparator, a voltage reference circuit for the comparator. In at least one embodiment, the circuit includes a circuit for monitoring the voltage across the charging capacitor. The comparator is used to control the electronic switch on the basis of the voltage across the charging capacitor in relation to the voltage which is generated by the voltage reference circuit and is applied to the comparator. In at least one embodiment, provision is made of a tap which is located between the rectifier and the first blocking diode and at which the circuit for monitoring the voltage across the charging capacitor is located. The circuit is in the form of an RC combination having a second blocking diode connected in series.

14 Claims, 2 Drawing Sheets

CIRCUIT FOR A POWER SUPPLY UNIT FOR GENERATING A DC VOLTAGE

PRIORITY STATEMENT

The present application hereby claims priority under 35 U.S.C. §119 on German patent application number DE 10 2008 027 583.2 filed Jun. 10, 2008, the entire contents of which are hereby incorporated herein by reference.

FIELD

At least one embodiment of the invention generally relates to a circuit for a power supply unit for generating a DC voltage. In at least one embodiment, it relates to a circuit for a power supply unit for generating a DC voltage having a current transformer, having a rectifier, having a series circuit comprising a first blocking diode and a charging capacitor, having an electronic switch which is in parallel with the current transformer, having a comparator, having a voltage reference circuit for the comparator, and having a circuit for monitoring the voltage across the charging capacitor, the comparator being used to control the electronic switch on the basis of the voltage across the charging capacitor in relation to the voltage which is generated by the voltage reference circuit and is applied to the comparator.

BACKGROUND

A known circuit for a power supply unit is used, for example in switchgear, to supply electronic overcurrent releases. The current transformer used in this case can be considered to be a non-ideal current source. This means that a secondary current which is proportional to the primary current is not always generated on account of saturation effects.

The power supply unit is used to generate a DC voltage for supplying the electronics of the overcurrent release. In this case, the secondary current which has been rectified by the rectifier charges the charging capacitor, with the result that the voltage rises across the latter. This voltage is monitored by the comparator which switches on the electronic switch when a voltage value predefined by the voltage reference circuit is reached.

This electronic switch which is in the form of a MOSFET, for example, short-circuits the current transformer on the secondary side, with the result that the voltage across the charging capacitor does not rise further. The blocking diode prevents the capacitor from being discharged via the electronic switch. If the voltage across the charging capacitor undershoots a particular lower limit value, the electronic switch is switched off again by the comparator and the charging capacitor is recharged via the secondary current of the current transformer.

This recharging operation can last for a plurality of half-cycles depending on the secondary current in the current transformer. The recharging operation can synchronize with the frequency of the primary current and may result in the current transformer being saturated. This distorts the waveform of the secondary current with respect to that of the primary current. Since the current transformer is often also used to measure the current, small currents, in particular, are measured incorrectly on account of the distortion.

SUMMARY

In at least one embodiment of the invention, a circuit is proposed for a power supply unit in which saturation effects on account of the recharging operation are avoided as far as possible.

In at least one embodiment, provision is made of a tap, which is located between the rectifier and the first blocking diode, and at which the circuit for monitoring the voltage across the charging capacitor is located, and by virtue of the fact that this circuit is in the form of an RC combination having a second blocking diode connected in series.

One particularly advantageous embodiment exists if the RC combination is designed in such a manner that its discharge time is shorter, preferably very much shorter, than the period duration of the primary current in the current transformer.

BRIEF DESCRIPTION OF THE DRAWINGS

One example embodiment of the invention is explained in more detail below using the drawings, in which.

DETAILED DESCRIPTION OF THE EXAMPLE EMBODIMENTS

Figure 1:
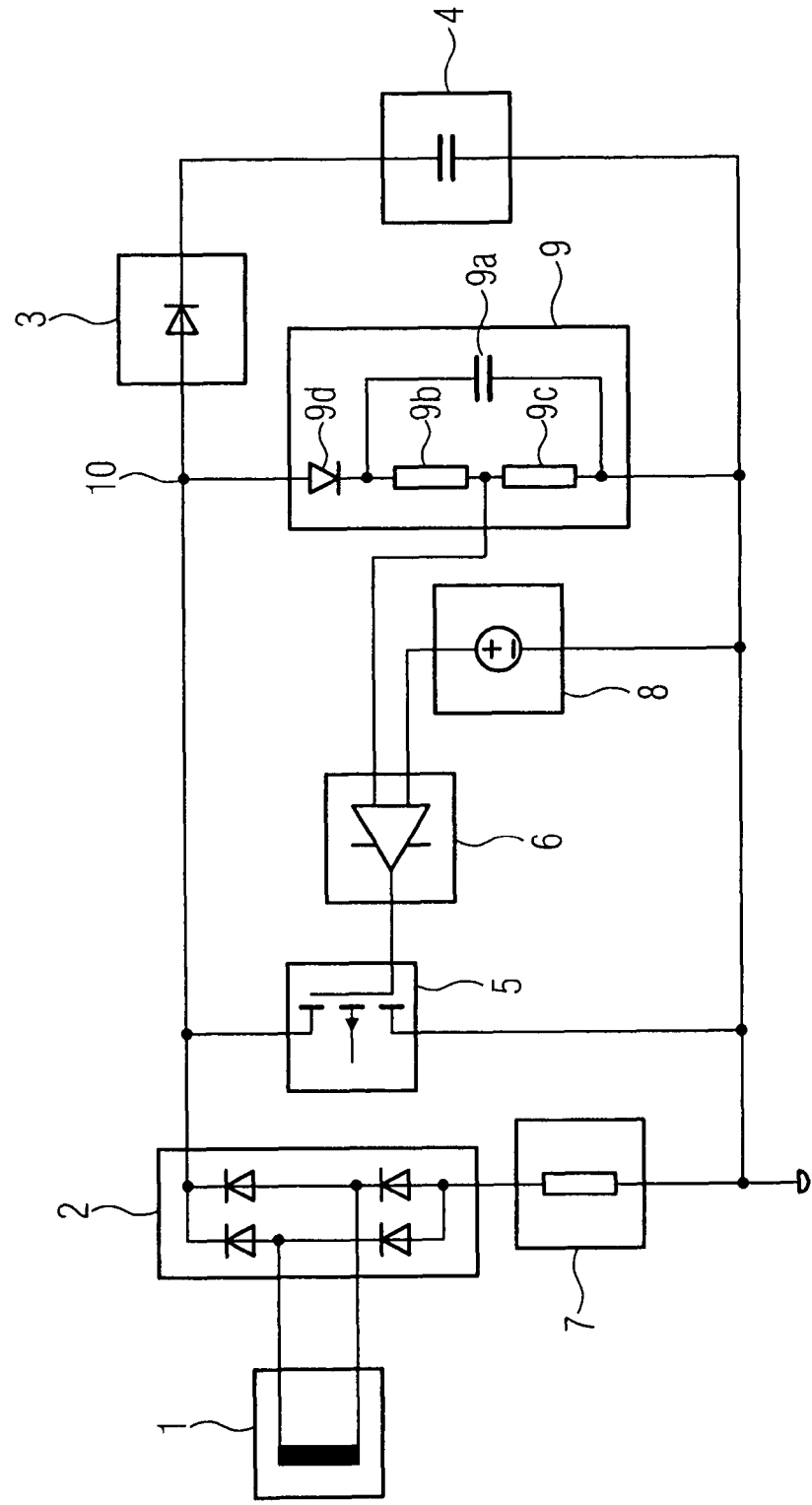
FIG. 1 shows a circuit according to an embodiment of the invention for a power supply unit for generating a DC voltage.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from For example, a first element could be termed a second and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

FIG. 1 shows a circuit according to an embodiment of the invention for a power supply unit for generating a DC voltage which is used, for example, to operate electronics. The power supply unit has a current transformer 1 through which an alternating current flows on the primary side. The primary current in the current transformer 1 is transferred to a secondary current and is supplied to a rectifier 2 in which the secondary current is rectified in a known manner. A first blocking diode 3 and a charging capacitor 4, which is charged by the rectified current, are in series with the rectifier 2 on one side and the load 7 is in series with the rectifier on the other side toward ground.

The charging can be interrupted by an electronic switch which is in parallel with the current transformer 1 and short-circuits the latter when it is switched on. A comparator 6 is used to control the electronic switch 5. For this purpose, a circuit 9 for monitoring the voltage across the charging capacitor 4 is provided, the circuit being located at the tap 10 between the rectifier 2 and the first blocking diode 3 and being connected to the comparator 6. The circuit 9 comprises an RC combination having a series circuit comprising two non-reactive resistors 9b, 9c and a capacitor 9a which is connected in parallel with this series circuit. A second blocking diode 9d is in series with this parallel circuit.

The power supply unit also has a voltage reference circuit 8 that is likewise connected to the comparator 6 and generates a reference voltage for the latter. If a particular upper charging voltage across the charging capacitor 4 is exceeded, the electronic switch 5 is switched on by the comparator 6 and the charging operation is thus interrupted. The capacitor 9a in the RC combination is discharged via the resistors 9b and 9c until a certain lower voltage value is reached. The comparator 6 then switches the electronic switch 5 off again and the charging capacitor 4 is recharged again.

A key feature of an embodiment of the present invention is that the voltage tap for the circuit 9 is located between the rectifier 2 and the first blocking diode 3 and the circuit 9 also has an RC combination and the second blocking diode 9d connected in series with the latter. The capacitor 9a in the RC combination is used in this case as a peak value store for the charging voltage. The peak value voltage which is stored in the capacitor 9a of the RC combination can be discharged via the resistor network 9b and 9c over a defined discharge time. The second blocking diode 9d prevents the capacitor from being discharged via the electronic switch 5.

Figure 2:
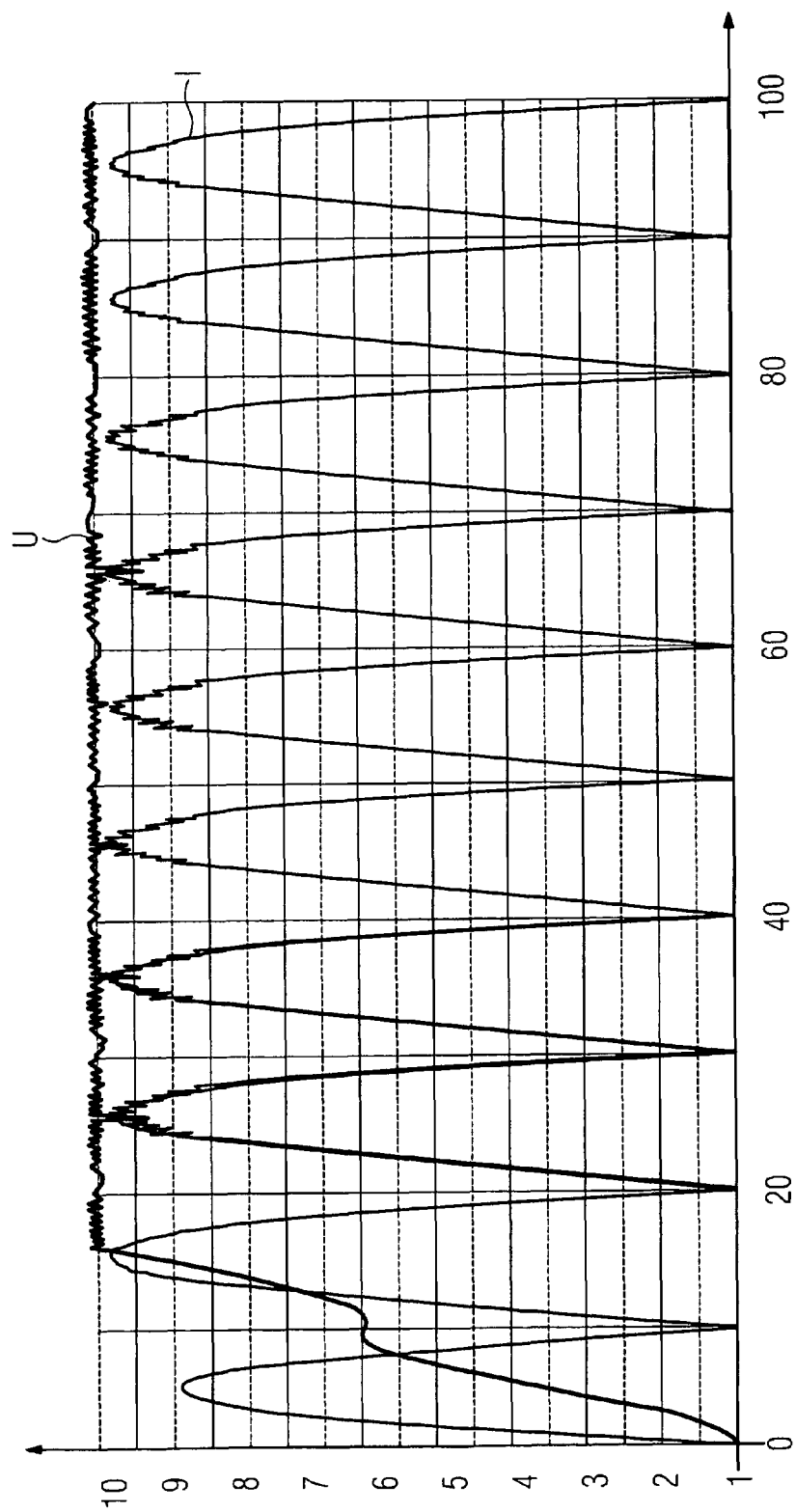
FIG. 2 shows curve profiles for the circuit according to an embodiment of the invention shown in FIG. 1.

If the discharge time of the RC combination is selected in such a manner that it is much shorter than the period duration of the primary current in the current transformer 1, the charging capacitor 4 is recharged several times per sinusoidal half-cycle in order to supply downstream electronics. The recharging time is thus shortened considerably and the secondary current in the current transformer 1 is distorted to a lesser extent since the number of recharging cycles per half-cycle is approximately constant, for example 10 cycles per half-cycle. The electronic switch 5 is therefore clocked by a type of PWM (pulse width modulation) signal and the charging capacitor 4 is thus uniformly recharged in each sinusoidal half-cycle, as shown by the curve profile U in the diagram according to FIG. 2. The other curve profile I reproduces the secondary current.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combineable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A circuit for a power supply unit for generating a DC voltage, the power supply unit including a current transformer, a rectifier, a series circuit including a first blocking diode and a charging capacitor, an electronic switch, in parallel with the output of the rectifier, a comparator and a voltage reference circuit for the comparator, the circuit comprising:
   a circuit for monitoring a voltage across the charging capacitor, the comparator being useable to control the electronic switch on the basis of the monitored voltage across the charging capacitor in relation to a voltage generated by the voltage reference circuit and applied to the comparator, wherein a tap is located between the rectifier and the first blocking diode, the circuit for monitoring the voltage across the charging capacitor being in the form of an RC combination including a second blocking diode connected in series and being located at the tap.

2. The circuit as claimed in claim 1, wherein the RC combination is designed in such that a discharge time of the RC combination is relatively shorter than a period duration of the primary current in the current transformer.

3. The circuit as claimed in claim 2, wherein the RC combination is designed in such that a discharge time of the RC combination is relatively very much shorter than a period duration of the primary current in the current transformer.

4. The circuit as claimed in claim 1, wherein the charging capacitor in the RC combination is used to store a peak value voltage.

5. The circuit as claimed in claim 4, wherein the peak value voltage is stored in the charging capacitor is dischargable via a resistor network over a defined discharge time.

6. The circuit as claimed in claim 5, wherein the second blocking diode prevents the charging capacitor from being discharged via the electronic switch.

7. The circuit as claimed in claim 1, wherein the RC combination includes a series circuit, including two non-reactive resistors, and a capacitor which is connected in parallel with the series circuit, the second blocking diode being in series with the parallel circuit.

8. A power supply unit for generating a DC voltage, comprising:
   a current transformer;
   a rectifier;
   a series circuit including a first blocking diode and a charging capacitor;
   an electronic switch, in parallel with the current transformer;
   a comparator and a voltage reference circuit for the comparator; and
   a circuit for monitoring a voltage across the charging capacitor, the comparator being useable to control the electronic switch on the basis of the monitored voltage across the charging capacitor in relation to a voltage generated by the voltage reference circuit and applied to the comparator, wherein a tap is located between the rectifier and the first blocking diode, the circuit for monitoring the voltage across the charging capacitor being in the form of an RC combination including a second blocking diode connected in series and being located at the tap.

9. The power supply unit as claimed in claim 8, wherein the RC combination is designed in such that a discharge time of the RC combination is relatively shorter than a period duration of the primary current in the current transformer.

10. The power supply unit as claimed in claim 9, wherein the RC combination is designed in such that a discharge time of the RC combination is relatively very much shorter than a period duration of the primary current in the current transformer.

11. The power supply unit as claimed in claim 8, wherein the charging capacitor in the RC combination is used to store a peak value voltage.

12. The power supply unit as claimed in claim 11, wherein the peak value voltage is stored in the charging capacitor is dischargable via a resistor network over a defined discharge time.

13. The power supply unit as claimed in claim 12, wherein the second blocking diode prevents the charging capacitor from being discharged via the electronic switch.

14. The circuit as claimed in claim 8, wherein the RC combination includes a series circuit, including two non-reactive resistors, and a capacitor which is connected in parallel with the series circuit, the second blocking diode being in series with the parallel circuit.

* * * * *